United States Patent [19]

Bunger

[11] 4,355,917
[45] Oct. 26, 1982

[54] STARTER JAW COUPLING FASTENER

[75] Inventor: Dennen J. Bunger, Clinton, N.Y.

[73] Assignee: The Bendix Corporation, Southfield, Mich.

[21] Appl. No.: 191,732

[22] Filed: Sep. 29, 1980

[51] Int. Cl.³ .............................................. F16D 1/06
[52] U.S. Cl. .................................. 403/24; 403/322; 403/330
[58] Field of Search ............... 403/322, 321, 330, 359, 403/24, 25, 260, 264

[56] References Cited

U.S. PATENT DOCUMENTS

| | | | |
|---|---|---|---|
| 1,258,647 | 3/1918 | Bowers | 74/551.9 |
| 1,497,711 | 6/1924 | Cox | 403/250 |
| 2,003,144 | 5/1935 | Graham, Jr. | 255/62 |
| 2,251,470 | 8/1941 | Stacey | 287/53 |
| 2,317,070 | 4/1943 | Le Tourneau | 287/53 |
| 2,622,298 | 12/1952 | Macedo | 24/211 |
| 2,695,800 | 11/1954 | Soucy | 287/53 |
| 2,794,633 | 6/1957 | Delany | 403/322 X |
| 2,822,986 | 2/1958 | Schreier | 238/377 |
| 3,525,271 | 8/1970 | Raines | 74/450 |
| 3,608,936 | 9/1971 | Karden | 403/322 X |
| 3,776,651 | 12/1973 | Peter et al. | 403/248 |
| 3,924,978 | 12/1975 | Loyd, Jr. et al. | 418/60 |

Primary Examiner—Andrew V. Kundrat
Attorney, Agent, or Firm—James R. Ignatowski; Russel C. Wells

[57] ABSTRACT

A fastener for securing a starter jaw coupling member to the accessory shaft of an internal combustion engine is disclosed. The fastener, attached to the starter jaw coupling member is inserted into an internally splined bore formed in the end of the accessory shaft. A pair of pivotally connected arms are rotated in opposite direction with a forward arcuate motion by advancing a bolt passing axially through the starter jaw coupling member. The rotated arms engage the rear ends of the accessory shaft's internal splines locking the starter jaw coupling member securely to the end of the accessory shaft.

17 Claims, 3 Drawing Figures

STARTER JAW COUPLING FASTENER

BACKGROUND OF THE INVENTION

The invention is related to face type engine starter jaw couplings and in particular a fastener for securing the member of the jaw coupling associated with the engine to the engine's accessory shaft.

PRIOR ART

Various aircraft engine starters, both electric and pneumatic, employ "face type" engaging jaw couplings to engage the starter to the engine. The face type jaw couplings have mating jaw assemblies, one associated the starter and one associated the engine. These jaw assemblies are normally separated except during a start cycle. During the initial phase of a start cycle, the jaw assembly associated to the starter, advances into engagement with the jaw assembly connected to an engine accessory shaft. The engine accessory shaft typically incorporates an internal spline and the associated jaw assembly is provided with a mating external spline. The starting torque is transmitted to the engine through these mating splines. It is important the jaw assembly be firmly fastened to the accessory shaft in a way which prevents axial movement. Axial movement of the jaw assembly attached to the accessory shaft will cause this rotating jaw assembly to engage the non rotating jaw assembly associated with the starter causing damage to both assemblies.

The prior art teaches various methods for attaching the jaw assembly to the accessory shaft. One method is an axial bolt coaxially passing through the jaw assembly and threaded into the center of the accessory shaft. The bolt locks the jaw assembly in place. Unfortunately, the accessory shaft of some engines do not have provisions for this type of assembly. In another fastening method a bolt is formed on the end of the accessory shaft. The jaw assembly has an central aperture which is received over the bolt and the jaw assembly is locked in place with a nut threaded onto the end of the bolt.

When the auxilliary shaft does not have a coaxial thread bore for receiving the bolt or a bolt formed on its end as described above, the prior art teaches a fastener consisting of two splined members, keyed to each other in such a way as to put the two splined members out-of-phase by ½ tooth. This causes the out-of-phase member to grip the relief normally existing at the back end of the accessory shaft's internal spline. This type of fastener is difficult to install and frequently the jaw assembly becomes loose and engages the jaw assembly associated with the starter damaging both members.

The difficulty in fastening the jaw assembly to the accessory shaft in the absence of a coaxially threaded bore is that the internal splined bore of the accessory shaft is blind. This prohibits the use of a tapered locking member such as taught by Tourneau in U.S. Pat. No. 2,317,070, Soucy in U.S. Pat. No. 2,695,800 or Loyd Jr. et al. in U.S. Pat. No. 3,924,978.

Bowers in U.S. Pat. No. 1,258,647 and Peter et al. in U.S. Pat. No. 3,776,651 addressed this problem using a tapered plug to expand a sleeve inserted into the blind bore causing a press fit. This type of fastener does not positively inhibit axial movement.

Stacey in U.S. Pat. No. 2,251,470 discloses a rotary tool holder discloses two pawls pivotally attached to the shaft. The two pawls are radially extended by a spring loaded wedge shaped cam. The extended pawls engage slots formed in a captivating hub locking the tool in place between the hug and a shoulder on the shaft.

Macedo in U.S. Pat. No. 2,622,298 discloses a tie-down means having two pivotal arms which are radially extended by a cam surface on a pin inserted between the arms. The two arms have dogs which in the extended position engage rails beneath the floor locking the tie-down means in place.

Gram Jr. in U.S. Pat. No. 2,003,144 and Schreier in U.S. Pat. No. 2,822,986 disclose fasteners using balls which are radially displaced by a conical cam wedged between them.

The disclosed fastener for holding the jaw assembly is an improvement over the fasteners of the prior art in that it provides a positive force holding the jaw assembly against the shoulder formed by the end of the accessory shaft eliminating all axial movement with respect to the accessory shaft.

SUMMARY OF THE INVENTION

The invention is a fastener for securing one member of a face type starter jaw coupling in a blind splined bore of an engine accessory shaft. The fastener comprises a pair of radially extending arms disposed in a slot formed at the end of the jaw member opposite the jaw face. The two arms are pivotable mounted to a common pivot pin disposed in a slot extending axially with respect to the axis of the jaw assembly. Two stationary pivot pins, one disposed on either side of the slot engage the back sides of the arms, causing them to rotate between a retracted position and an extended position as the common pivot pin is moved axially within the slot. A bolt received in an axially disposed threaded bore formed in the jaw member engages the arms proximate the pivot pin. Screwing the bolt into the threaded bore urges the arms in a rearward direction. The pivot point of the arms guided by the common pivot pin disposed in the slot moves parallel to the axis of the jaw member. The rearward motion of the arms constrained by the stationary pivot pins, causes their extremities to extend in a radial direction with an accompanying arcuate motion towards the forward end of the accessory shaft. The forward motion of the extended radial arms causes them to engage the rear end of the accessory shaft's spline securely locking the jaw member in place.

The object of the invention is a fastener for securing a face type jaw coupling member to the end of an engine accessory shaft. Another object of the invention is a fastener which applies a positive pressure in a direction holding the jaw member to the end of the accessory shaft. Still another object of the invention is a fastener for holding an assembly in a bind internally splined bore having two radial arms engaging the back ends of the internal spline. A final object is jaw assembly fastener for securing one jaw member of a face type jaw coupling to an engine accessory shaft which is easy to install and remove.

Further objects and advantages of the disclosed starter jaw coupling fastener will become apparent on consideration of the accompanying description and drawings.

DETAILED DESCRIPTION OF THE INVENTION

Figure 1:
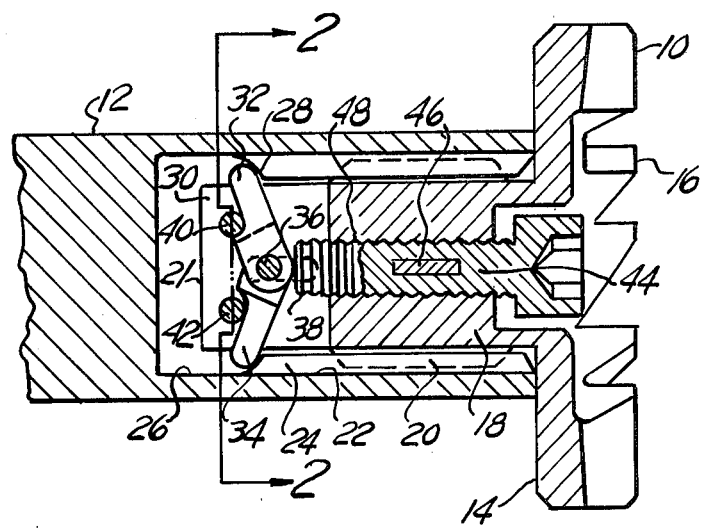
FIG. 1 is a cross sectional view of a jaw coupling assembly embodying the disclosed fastener in the extended position.
Figure 2:
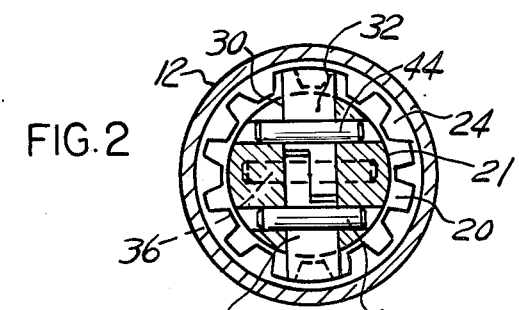
FIG. 2 is a cross sectional view taken normal to the axis of the jaw coupling assembly.

Referring to FIGS. 1 and 2 there is shown one member of a face type starter jaw coupling 10 attached to the end of engine's accessory shaft 12 by means of the disclosed fastener. The member 10 has a radial flange 14. On the face of the radial flange 14 are formed a plurality of saw teeth 16 which engage a mating set of saw teeth formed on a similar jaw coupling member (not shown) attached to a starter motor. The starter motor may be electrically or pneumatically driven as is known in the art.

The starter jaw coupling member 10 has a intermediate section 18 having a plurality of external splines 20 and a rear section 21. The intermediate section 18 is received in a bore 22 of the accessory shaft 12. The bore 22 has a plurality of internal splines 24 which mate with the splines 20 of the intermediate section. An undercut 26 at the bottom of bore 22 forms a shoulder 28 at the end of each internal spine 24.

A diametrical slot 30 passing through the axis of the starter jaw member is formed at the end of the rear section 21. Disposed in slot 30 are two arms 32 and 34 which are pivotally connected by a pivot pin 36. The pivot pin 36 is captivated in a guide slot 38 formed in the rear section 21 normal to slot 30. Slot 38 permits the pivot pin 36 and the pivotally connected ends of arms 32 and 34 to move linearly in a direction parallel to the axis of the starter jaw member 10. The rearward sides of the arms 32 and 34 engage two stationary stops, such as pins 40 and 42 respectively bridging the slot 30 either side of the start jaw member axis.

A lock screw 44 having a locking nylon insert 46 is received in a threaded bore 48 formed coaxially with the axis starter jaw member 10.

Figure 3:
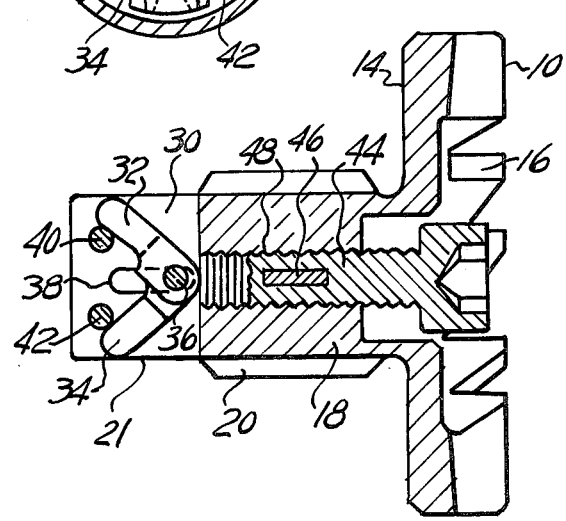
FIG. 3 is a cross sectional view of the disclosed jaw coupling assembly with the fastener retracted.

To insert the jaw coupling member 10 into the bore 22 formed in the end of the accessory shaft 12, the screw 44 is retracted a distance sufficient to permit pivot pin 36 to move to the forward end of slot 38 as shown in FIG. 3. With the pivot pin in this position, the arms 32 and 34 radially collapse against the two fixed pins 40 and 42 as shown with their extremeties substantially flush with the external surface of the rear section 21 of the jaw coupling member 10. In this state the jaw member coupling 10 is inserted into the bore 22 formed in end of the accessory shaft 12 as shown in FIG. 1.

The screw 44 is then advanced in the threaded bore 46 urging the arms 32 and 34 along with pivot pin 36 towards the rear end of the slot 38. The rearward motion of the arms 32 and 34 constrained by pins 40 and 42 cause arms 32 and 34 to extend radially. Simultaneously, the arms 32 and 34 pivot about the fixed pins 40 and 42 respectively such their radially extending extremeties undergo a forward arcuate motion as the pin 36 is urged towards the rear of slot 38.

After the screw is advanced a sufficient distance, the radially extending extremeties of arms 32 and 34 engage the rear surface 28 of splines 20 pulling the radial flange 14 into firm abutment with the end of the accessory shaft 12 as shown in FIG. 1. The locking plastic insert inhibits movement of the screw 44 after the jaw member is secured to the end of the accessory shaft 12.

The jaw member 10 may be removed from the accessory shaft 10 by retracting screw 44 permitting the arms 32 and 34 along with pivot pin 36 to move forward in slot 38. Pulling the jaw member in a direction away from the end of the accessory shaft 12 with the screw 44 in the retracted position exerts a rearward force on the extremeties of arms 32 and 34. The arms 32 and 34 pivot about the fixed pins 40 and 42 urging pivot pin 36 forward in slot 38. The combined pivotal motion of arms 32 and 34 along with the forward motion of pin 36 cause the arms to radially contract facilitating the removal of the jaw coupling member 10 from the bore 22 past splines 20.

It is understood that persons skilled in the art may make changes in the preferred embodiment of the disclosed starter jaw coupling fastener without departing from the scope and spirit of the invention as set forth in the appended claims.

What is claimed is:

1. A starter jaw coupling having a fastener for securing one member of a starter jaw coupling to the end face of an accessory shaft having an internally splined bore; wherein the internally splined bore of the accessory shaft has an undercut at the bottom thereof forming a shoulder at the internal end of each spline, said starter jaw coupling characterized by:

a starter jaw member having an axis of symmetry, said starter jaw member comprising a forward facing radial flange section having a plurality of jaw teeth on the face thereof, an intermediate splined section having an externally splined surface mating with the internal splines of the accessory shaft, and a cylindrically shaped rear section having an arm slot diametrically disposed therethrough;

a pivot pin disposed in said rear section, transversely bridging said arm slot coincident with said axis;

a pair of arms, each arm having one end pivotally connected to said pivot pin; and means for rotating said arms in opposite directions about said pivot pin to produce at the ends of said arms, opposite said pivotal connection, a radially extending arcuate movement towards said radial flange section, said radially extending arms engaging at least two diametrically opposite shoulders of the accessory shaft's internal splines producing a force holding said starter jaw member securely within the bore of said accessory shaft.

2. The starter jaw coupling of claim 1 wherein said rear section includes a pivot pin slot axially disposed in a plane transverse to said arm slot and wherein said pivot pin is disposed in said pivot pin slot.

3. The starter jaw coupling of claim 2 wherein said means for rotating comprises:

two stationary stops transversely bridging said arm slot adjacent to the rear end of said pivot pin slot and engaging the rear surface of said arms, said stationary stops disposed, one on either side of said axis intermediate said axis and the external surface of said rear section;

a threaded bore coaxially passing through said starter jaw member; and a bolt having a head and an end face threadably received in said threaded bore, the end face of said screw engaging said arms proximate said pivot pin, urging said arms and pivot pin to move laterally along said pivot pin slot causing said arms to pivot about said stationary stops and produce said arcuate movement.

4. The starter jaw coupling of claim 3 wherein said radial flange has a counter sunk bore on its front face concentric about said threaded bore, said counter sunk bore receiving the head of said bolt with the starter jaw member in the locked state.

5. A fastener for securely fastening one member of a starter jaw coupling to the end face of an accessory shaft having an internally splined bore, said internally splined bore having an undercut at the bottom thereof forming a shoulder at the internal end of each spline adjacent to the undercut, and said starter jaw coupling member having a radially extending flange having a plurality of jaw teeth on the face thereof and a coaxial externally splined section mating with the internally splined bore of the accessory shaft, said fastener characterized by:
   a cylindrical section coaxially integral with the splined section of the starter jaw coupling member on the end opposite said radial flange, said cylindrical section having an arm slot disposed diametrically therethrough;
   a pair of arms disposed in said arm slot, each of said arms having one end pivotally connected to the other proximate the axis of said cylindrical section;
   means for rotating said arms in opposite directions about the ends pivotally connected to produce at the ends of the arms, opposite the ends pivotally connected, a radially extending arcuate movement towards said radial flange section, the radially extending ends of the arms engaging at least two diametrically opposite shoulders of the accessory shaft's internal splines producing a force holding said starter jaw coupling member securely against the end face of said accessory shaft.

6. The fastener of claim 5 wherein said cylindrical section has an axially extending pivot pin guide slot diametrically disposed normal to said arm slot, said fastener further includes a pivot pin disposed in said pivot pin guide slot pivotally connecting the one ends of said arms.

7. The fastener of claim 6 wherein said means for rotating comprises:
   two stationary stop members transversely bridging said arm slots adjacent to the end of said pivot pin guide slot opposite said coaxially splined section, one of said stationary stops disposed either side of the axis of the starter jaw coupling member intermediate said axis and the external surface of said cylindrical section; and
   means for producing a mechanical force displacing said pivot pin and connected arms along said guide slot towards said two stationary stop members, the displacement of said arms, inhibited by said stationary stop members causes the ends of the arms opposite the pivotally connected ends to rotate with said radially extending arcuate motion.

8. The fastener of claim 7 wherein said means for producing a mechanical force comprises:
   a threaded bore coaxially passing through said starter jaw coupling; and
   a bolt threadably received in said threaded bore and engaging said arms proximate said pivot pin.

9. A jaw coupling assembly comprising:
   a shaft having an internally splined bore, said internally splined bore having an undercut at the bottom thereof forming a fastener seat at the internal end of each spline;
   a jaw coupling member having a front facing radial flange containing a plurality of jaw teeth on the front face thereof, an intermediate section having a plurality of external splines mating with the internal splines of said shaft, and a cylindrical rear section having an arm slot diametrically disposed therethrough;
   a pair of arm members disposed in said arm slot, each of said arm members having one end pivotally connected about a common axis transverse to the axis of said jaw coupling member; and
   means for rotating said arms in opposite directions within said arm slot and about said common axis to produce at the ends of said arm members, opposite said one ends, a radially extending arcuate motion towards said radial flange, the ends of said arm members opposite said one end, engaging the fastener seat at the internal ends of at least two diametrical opposite internal splines of the shaft producing a force holding said jaw coupling member securely in the splined bore of said shaft.

10. The jaw coupling assembly of claim 9 wherein said cylindrical section has a pin guide slot diametrically disposed normal to said arm slot, said assembly further including a pivot pin disposed in said pin guide slot and rotationally connected to the one end of both of said arm members, said pivot pin comprising said common axis.

11. The jaw coupling assembly of claim 10 wherein said means for rotating comprises:
   a pair of stationary stop members transversely bridging said arm slot adjacent to the end of said pin guide slot opposite the end adjacent to said intermediate section, one of said stationary stop members disposed each side of said pin guide slot intermediate the axis of the cylindrical rear section and its external surface and engaging the rearward facing surface of said arm members; and
   means for producing a mechanical force laterally displacing said pivot pin and connected arm member along said guide slot towards said pair of stationary stop members, the lateral displacement of said arm members, inhibited by said pair of stationary stop members causes the arm members to rotate about the pivot pin in opposite directions producing said radially extending arcuate movement.

12. The starter jaw coupling assembly of claim 11 wherein said means for producing a mechanical force comprises:
   a threaded bore coaxially passing through said starter jaw coupling;
   a bolt, threadably received in said threaded bore, the end of said bolt engaging said arm members as it approaches the end of its travel urging the arm members and the connected pivot pin to be laterally displaced along said guide slot towards said stationary stop members.

13. A fastener for connecting a rotary member to a shaft having an internally splined bore at one end, said internally splined bore having a relief at the bottom of the bore forming a shoulder at the end of each spline adjacent to the relief, comprising:
   a rotary member having an externally splined section mating with the internal splines of said bore and a cylindrical extention adapted to be received in said internally splined bore, said cylindrical extension having an arm slot disposed diametrically therethrough;

a pair of arm members disposed in said arm slot, each of said arm members having one end pivotally connected to the other about a common axis transverse to the axis of said cylindrical extention; and means for rotating said arm members in opposite directions within said arm slot about said common axis to produce at the ends of said arm members, opposite said one ends, a radially extending forward arcuate motion, the ends of said arm members opposite said one ends, engaging the shoulders at the ends of at least two diametrically opposite internal splines of the shaft producing a force holding said rotary member in the internal bore of said shaft.

14. The fastener of claim 13 wherein said cylindrical extension has a guide slot diametrically disposed normal to said arm slot, said fastener further including a pivot pin disposed in said guide slot and pivotally connected to the one end of each arm member, said pivot pin comprising said common axis.

15. The fastener of claim 14 wherein said means for rotating comprises:

a pair of stationary stop members transversely bridging said arm slot adjacent to the end of said guide slot opposite the end adjacent to said splined section and engaging the rear surfaces of said arm members, one of said stationary stop members disposed each side of said guide slot intermediate the axis of the cylindrical extension and its external surface; and means for producing a mechanical force laterally displacing said pivot pin and connected arms along said guide slot towards said pair of stationary stop members, the lateral displacement of said arms, inhibited by said pair of stationary stop members rotates the arms about the pivot pin in opposite directions producing said radially extending arcuate movement.

16. The fastener of claim 15 wherein said means for producing a mechanical force comprises:

a threaded bore coaxially passing through said rotary member;

a bolt, threadably received in said threaded bore, the end of said bolt engaging said arm members as it approaches the end of its travel urging the arm members and the connected pivot pin to be laterally displaced along said guide slot towards the stationary stop members, the lateral displacement of said arm members inhibited by said stationary stops cause the arm members to rotate about the pivot pin in opposite directions producing said radially extending arcuate motion.

17. The fastener of claim 16 wherein said shaft is the accessory shaft of an internal combustion engine and said rotary member is one member of a starter jaw coupling.

* * * * *